Figure 1:
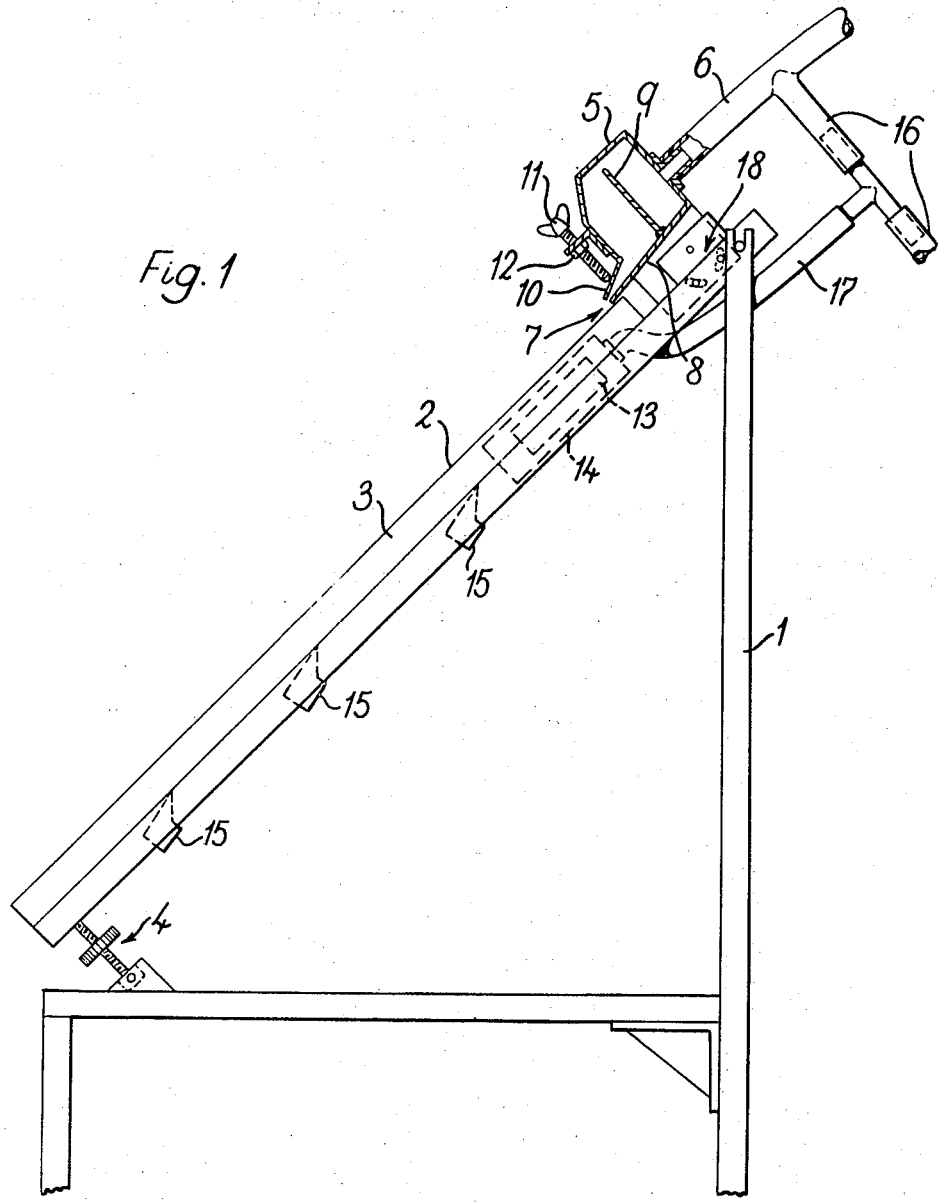

United States Patent [19]
Wallis

[11] 3,864,249
[45] Feb. 4, 1975

[54] SEPARATOR
[75] Inventor: James William Wallis, Rochester, England
[73] Assignee: Wallis Separators Limited, Kent, England
[22] Filed: Mar. 14, 1973
[21] Appl. No.: 340,944

[30] Foreign Application Priority Data
Mar. 24, 1972  Great Britain.............. 013884/72

[52] U.S. Cl.................... 210/19, 210/389, 209/269, B01d 35/20, 209/365
[51] Int. Cl............................................. 209/1
[58] Field of Search .............. 210/19, 388, 389, 77; 209/365, 327, 329, 333, 341, 346, 1, 269

[56] References Cited
UNITED STATES PATENTS
2,183,896  12/1939  Rupp et al. ............................ 210/19
2,799,398  7/1957  Heymann ............................... 210/19
3,707,230  12/1972  Davidson ............................... 210/19
3,713,540  1/1973  Davidson et al. ..................... 210/19
3,720,306  3/1973  Hedler ................................... 210/19
3,766,059  10/1973  Susaki................................... 210/19

Primary Examiner—Samih N. Zaharna
Assistant Examiner—F. F. Calvetti
Attorney, Agent, or Firm—Finnegan, Henderson, Farabow & Garrett

[57] ABSTRACT

A separator for effecting separation of solid materials from liquids which comprises means for directing a mixture of a solid material and a liquid into contact with a filter screen and means for subjecting the filter screen to acoustic pressure waves, the arrangement being such that in operation liquid passes through the filter screen and solid materials are retained thereon and travel along the filter screen.

22 Claims, 2 Drawing Figures

SEPARATOR

This invention relates to the separation of solid materials from liquids.

It has been proposed to provide a separator having a horizontally arranged filter screen which is immersed in the solid/liquid mixture and means for generating acoustic pressure waves in the liquid. With this separator a pump is provided which draws filtered liquid through the screen. It has, however, been found in practice that in spite of the generated acoustic pressure waves in the liquid the filter screen soon becomes clogged with solid particles which if not removed tend to collect on the up-stream side of the separator and necessitate frequent cleaning of the screen.

According to the present invention there is provided a separator in which the need for such frequent cleaning of the filter screen is minimised.

The present invention provides a separator for effecting separation of solid materials from liquids which comprises means for directing a mixture of a solid material and a liquid into contact with a filter screen and means for subjecting the filter screen to acoustic pressure waves, the arrangement being such that in operation liquid passes through the filter screen and solid materials are retained thereon and travel along the filter screen.

The invention also provides a process for effecting separation of solid materials from liquids, which comprises directing a mixture of a solid material and a liquid into contact with a filter screen and subjecting the filter screen to acoustic pressure waves the arrangement being such that liquid passes through the screen and solid material is retained thereon and travels along the screen.

In a preferred embodiment, the separator is provided with an acoustic pressure wave transducer arranged close to but not touching the filter screen so that in operation liquid passing through the screen couples acoustic pressure waves from the liquid to the screen. The transducer is preferably positioned approximately at the point where in operation the bulk of the liquid is passing through the screen.

The invention may be used in the separation of solid material from various industrial effluents such as for example paper mill sludge and food industry effluents, and in the treatment of ores in mining technology. In addition to the cleansing action of the acoustic pressure waves on the filter screen, they may also accelerate a chemical reaction in the solid/liquid mixture. For example, the separator of the invention has been found to be particularly suitable for use in the de-inking of waste paper slurries.

The filter screen preferably has a planar surface, although this is not essential. The screen can, for example, be part of a cylinder, or a cone arranged with its axis vertical. The screen is arranged so that solid materials can travel along it, either under the influence of gravity, or due to the washing action of liquid flowing along the screen or both. Where the filter screen has a planar surface, it should preferably be arranged at an angle to the horizontal sufficient to allow the solid material to travel down the screen. The angle of the screen to the horizontal is dependent upon the nature of the mixture which is to be separated but preferably is from 30° to 85°, and most preferably from 35° to 45°. Excellent results have been obtained when separating solid material from paper mill sludge using a screen angle to the horizontal of from 38.5° to 41°. The filter screen is preferably formed from a flat, liquid permeable, sheet material which can for example, be a porous or sintered material, or a perforated mesh. Good results have been obtained using stainless steel mesh as the filter screen. Preferably the filter screen should be kept taut during operation. The particle size of solid material retained on the filter screen is a function both of the mesh size of the screen and the power of available sources of acoustic pressure waves. With low power sources, the particle size of solid material retained on the screen will depend predominantly on the mesh size but with high power sources, particles that would normally pass through an open area of mesh may be retained on the screen. A mesh size of less than 10 BSS mesh and preferably from 20 to 360 BSS mesh has been found to be very suitable in many cases.

The mixture of solid material and liquid is preferably directed on to the filter screen through a header box having an adjustable orifice. The area of the orifice will depend upon the required flow rate of the mixture and the fluid pressure in the pipes leading to the header box. In general it has been found extremely desirable to impart to the mixture a component of velocity parallel to the screen since this creates a washing action which assists in preventing the screen from clogging. Preferably the mixture is discharged through the orifice under a pressure such that it is projected along the screen with a velocity sufficient to maintain part of the screen substantially clear of solid materials whilst permitting liquid to pass through that part of the screen. The fluid pressure necessary to give the required velocity will depend on the nature of the mixture to be separated and may easily be determined by experiment. Usually the fluid pressure is within the range 15 to 30 p.s.i. The required pressure may be maintained in the header box by adjusting the area of the orifice. Generally the length of the orifice should be approximately the full width of the filter screen, and the width of the orifice should be up to about ½ inch. In practice it is usually found that the preferred orifice width is about ⅛ inch.

It has been found that the angle at which the flow of mixture contacts the filter screen has an effect upon the efficiency of the separator. Preferably means are provided to vary the angle of contact, for example, by making the header box pivotable about a horizontal axis. The angle of contact should preferably be from 0° (parallel) to about 10°.

The throughput of the separator is dependent upon the size of the filter screen but for an average sized separator a throughput of the order of 5,000 to 10,000 gallons per hour is typical.

The term "acoustic pressure waves" in the content of this specification includes pressure waves of both sonic and ultrasonic frequency. Preferably, however, the filter screen is subjected to ultrasonic pressure waves by means of an ultrasonic transducer arranged close to but not touching the filter screen and positioned approximately at the point where the bulk of the liquid is passing through the screen. This point will depend on the velocity of the mixture issuing from the header box but is generally from about 6 inches to 18 inches from the orifice. Normally the transducer will need to be cooled in operation and this cooling may be effected by liquid passing through the screen or by a separate supply of cooling liquid. If necessary a reservoir may be provided around the transducer to retain some of the cooling liquid. The distance from the transducer to the screen will be dependent upon the wave length of the acoustic pressure waves and in general the transducer should be arranged such that an antinode of the pressure waves is immediately adjacent to the screen. Preferably the transducer is from ¼ inch up to about 1 inch from the screen. A suitable transducer is the Radyne IT 10/1 which is a 1 kilowatt transducer having an operating frequency around 25 kilocycles and an output of 9.8 watts per sq. inch driven by a Radyne USG. 10. Using such a transducer, a planar filter screen having a length of about 3 to 4 feet and a width of about 2 to 3 feet has been found to be very suitable.

Preferably there is provided means for breaking the surface tension of the liquid flowing through the filter screen in order to prevent liquid adhering to the downstream side of the filter screen. The surface tension breaking means may comprise a plurality of angle pieces touching the downstream side of the screen and extending the full width of the screen. About one angle piece for each foot of length of the screen is usually adequate. The angle pieces are preferably arranged at an angle of about 45° to the plane of the screen measured in the direction of liquid flow.

Figure 2:
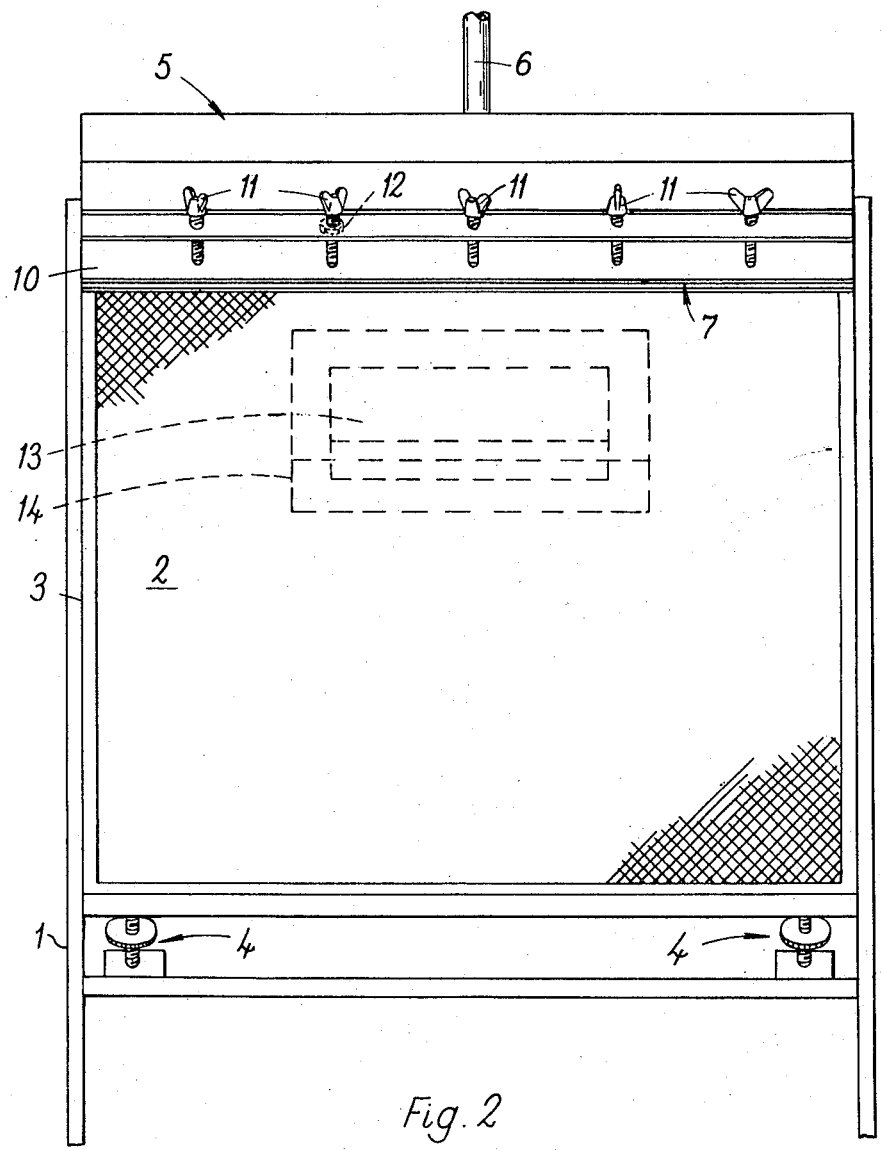

An embodiment of a separator according to the invention will now be described by way of example with reference to the accompanying drawings in which:

FIG. 1 shows a side elevation, and
FIG. 2 shows a front elevation, of the separator.

Referring to FIGS. 1 and 2, the separator comprises a support frame 1, carrying an inclined filter screen 2 which is held taut by a screen frame 3 pivotally mounted on the support frame. The angle of the filter screen to the horizontal may be varied by means of mounting screws 4 positioned between the support frame and the screen frame. Mounted above the filter screen is a header box 5 having an inlet pipe 6 and a variable outlet orifice 7. The header box is pivotably mounted on mounting brackets 18 so that it can pivot about a horizontal axis and in the drawings is arranged so that the floor 8 of the header box is at an angle of about 5° to the plane of the filter screen. Positioned inside the header box is a baffle 9 which extends from the floor of the header box to equalise the pressure in the header box. The outlet orifice 7 of the header box is formed by the floor 8 and an adjustable plate 10 hinged to the header box. The edge of the floor 8 forming the outlet orifice is rounded to ensure that the solid/liquid mixture breaks cleanly from the orifice, and the leading edge of plate 10 is formed as a knife edge with an angle of 20° to the top surface so that the ground portion is in orifice 7. Mounted on the header box above the plate 10 are a number of adjustable screws 11 which bear on the plate 10 and enable the profile of the orifice to be altered. The screws 11 pass through screw-threaded mountings 12.

Mounted beneath the filter screen is a Radyne IT 10/1 1 kilowatt ultrasonic transducer 13, positioned about 6 inches downstream of the orifice 7. The transducer is positioned between ½ to 1 inch away from the screen 2 and is surrounded by a reservoir 14 which is open at the top. Angle pieces 15 are arranged downstream of the transducer and touching the screen 2. The header box inlet pipe 6 is also connected to a liquid pipe 16 by which fresh liquid can be introduced into the mixture. This is particularly advantageous, for example, in the de-inking of paper pulp. The liquid inlet pipe 16 has a further connection pipe 17 to supply cooling liquid to the reservoir 14.

In operation solid/liquid mixture from the inlet 6 is optionally mixed with fresh liquid from the liquid inlet 16 and passes to the header box 5 and over the baffle 9. The baffle 9 equalises the pressure in the header box so that the resulting flow and velocity of the solid/liquid mixture through the orifice 7 is the same at any given point along its length. The orifice 7 is adjusted by means of the screws 11 to give the appropriate profile and rate of flow. The solid/liquid mixture then contacts the screen 2, whereupon the liquid passes through and the solid is retained and carried down the screen by its own weight. The screen is kept free by means of the ultrasonic energy transmitted from the transducer by the liquid curtain passing through the screen. Liquid is collected in the reservoir 14 and serves to cool the transducer together with liquid from the inlet connection pipe 17. The angle pieces 15 break the surface tension of the liquid and prevent it clinging to the underside of the screen. The separated liquid is run off from beneath the screen and the solid material collects at the foot of the screen.

I claim:

1. A separator for effecting separation of solid materials from liquids which comprises a filter screen, means for directing a mixture of a solid material and a liquid into contact with the filter screen and means for subjecting the filter screen to acoustic pressure waves comprising an acoustic pressure wave transducer arranged close to but not touching the filter screen so that in operation liquid passing through the screen couples acoustic pressure waves from the transducer to the screen, the arrangement being such that in operation liquid passes through the filter screen and solid materials are retained thereon and travel along the filter screen.

2. A separator according to claim 1, in which the transducer is positioned approximately at the point where in operation the bulk of the liquid is passing through the screen.

3. A separator according to claim 1 in which the filter screen has a planar surface.

4. A separator according to claim 3 in which the filter screen is arranged at an angle to the horizontal.

5. A separator according to claim 4, in which the angle of the screen to the horizontal is from 30° to 85°.

6. A separator according to claim 4, in which the angle of the screen to the horizontal is from 35° to 45°.

7. A separator according to claim 1, in which the filter screen has a mesh size of from 20 to 360 BSS mesh.

8. A separator according to claim 1, that is provided with a header box having an adjustable orifice through which in operation the mixture of solid material and liquid is directed on to the filter screen.

9. A separator according to claim 8, in which the orifice of the header box is arranged so that in operation the mixture of solid material and liquid is provided with a component of velocity parallel to the screen.

10. A separator according to claim 1, in which means are provided to vary the angle of contact of the flow of the mixture of solid material and liquid with the filter screen.

11. A separator according to claim 10, which is provided with a header box pivotable about a horizontal axis.

12. A separator according to claim 1 in which there is provided means for breaking the surface tension of the liquid flowing through the filter screen.

13. A separator according to claim 12, in which the surface tension breaking means comprises a plurality of angle pieces lying beneath the screen.

14. A separator according to claim 1, in which there is provided means for introducing fresh liquid into the mixture before it is discharged on the screen.

15. A process for effecting separation of solid materials from liquids which comprises directing a mixture of a solid material and a liquid into contact with a filter screen and subjecting the filter screen to acoustic pressure waves generated by an acoustic pressure wave transducer arranged close to but not touching the filter screen so that in operation liquid passing through the screen couples acoustic pressure waves from the transducer to the screen, the arrangement being such that liquid passes through the screen and solid material is retained thereon and travels along the screen.

16. A process according to claim 15, in which there is imparted to the mixture a component of velocity parallel to the screen.

17. A process according to claim 15, in which the mixture is projecting along the screen with a velocity sufficient to maintain a part of the screen substantially clear of solid material whilst permitting liquid to pass through that part of the screen.

18. A process according to claim 17 in which the mixture is directed into contact with the filter screen under a fluid pressure of from 15 to 30 lbs. per sq. inch.

19. A process according to claim 15 in which the acoustic pressure waves are ultrasonic pressures waves and the transducer is an ultrasonic pressure wave transducer.

20. A separator for effecting separation of solid materials from liquids which comprises a filter screen, means for directing a mixture of solid material and a liquid into contact with the filter screen, and an ultrasonic transducer for subjecting the filter screen to acoustic pressure waves, said transducer being arranged close to but not touching the filter screen so that in operation liquid passing through the screen couples ultrasonic pressure waves from the transducer to the screen, the arrangement being such that in operation liquid passes through the filter screen and solid materials are retained thereon and travel along the filter screen.

21. A separator according to claim 20, in which the ultrasonic transducer is arranged at a distance of from ¼ inch to 1 inch from the screen.

22. A separator according to claim 20, in which a reservoir is provided around the transducer to retain cooling liquid.

* * * * *